Aug. 25, 1925.  
A. O. PAYNE  
FILLER SPOUT  
Filed Oct. 23, 1924
1,550,738
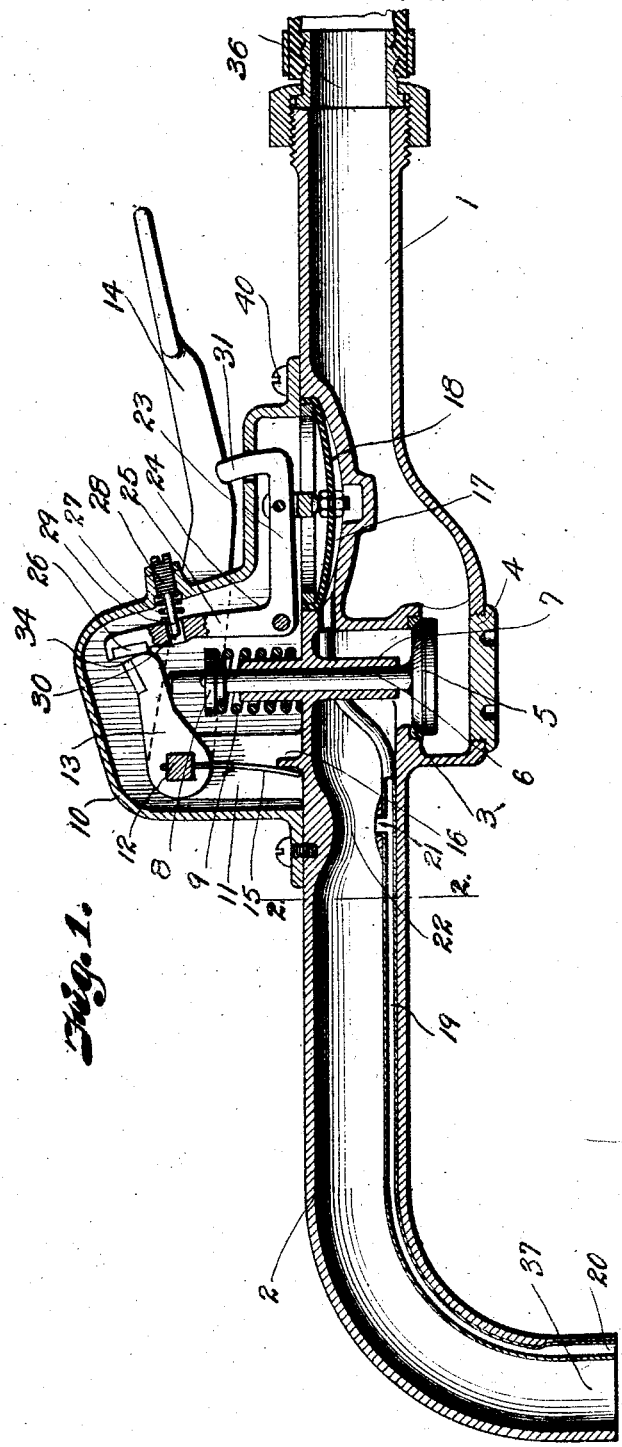
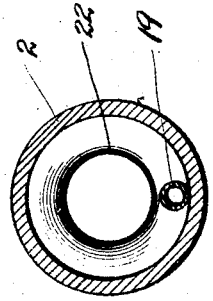
INVENTOR  
Amos O. Payne  
BY  
ATTORNEY Patented Aug. 25, 1925.

1,550,738

UNITED STATES PATENT OFFICE.

AMOS O. PAYNE, OF WICHITA, KANSAS.

FILLER SPOUT.

Application filed October 23, 1924. Serial No. 745,362.

*To all whom it may concern:*

Be it known that I, AMOS O. PAYNE, a citizen of the United States, residing at Wichita, in the county of Sedgwick and State of Kansas, have invented certain new and useful Improvements in Filler Spouts; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to filler spouts for dispensing liquids from tanks and the primary object is to provide a filler spout or nozzle which will automatically cut off the supply of the liquid when the receptacle into which the liquid is being dispensed becomes full or reaches a predetermined level, for example it is customary to dispense gasoline and the like from tanks into the gasoline tank or receptacle of a motor vehicle. The gauges on the motor vehicle tank are often inaccurate so it is difficult to know the exact amount of liquid in the motor vehicle tank. As a result the tank frequently overflows so that the gasoline spatters over the paint or spills over the car or upon the ground, causing danger of fire. It is to be understood of course that the spout is not limited for any particular use. It may be used for filling any kind of tank or receptacle. It is described in connection with automobile tanks however for the reason that they will be its most general use.

I have provided means whereby the supply of liquid will be automatically cut off when the level in the receiving tank reaches a predetermined point, thereby eliminating possibility of the receiving tank overflowing and I have also provided means whereby the supply may be manually cut off anytime during the flow.

The novel construction of the invention will be clearly understood by reference to the following description in connection with the accompanying drawings, in which Fig. 1 is a vertical, longitudinal, sectional view through a filler spout constructed in accordance with my invention, and Fig. 2 is a cross sectional view on the line 2—2 of Fig. 1.

The spout is shown as comprising an elongated tubular member 1 with a nozzle 2 at one end. The tubular member or casing 1 is provided with a valve seat 3 beneath which is a plug 4 so that the valve 5 for the seat 3 may be inserted in the casing 1. The valve is provided with a stem 6, reciprocally mounted in a valve stem guide 7 and it carries a collar 8 against which one end of an expansion spring 9 bears, the other bearing against the top of the casing 1. Therefore there will be a normal tendency for the valve to be seated. In a housing 10 mounted on the casing 1 is a bracket 11 in which is mounted a rock shaft 12 carrying at one end a valve stem actuating finger 13 and at the other end outside the housing 10 is a hand lever 14 which may be swung in a downward position to rock the shaft 12 to cause the finger 13 to press the valve against the action of the spring 9 so as to unseat the valve 5. The rock shaft 12 carries a spring plate or flat spring 15, one end of which is adapted to abut against the lug 16 on the top of the casing 1 to act as a shock absorber when the lever 14 is released and the spring seats the valve. In other words the flat or leaf spring 15 constitutes a rebound spring. The construction thus far described is common to most filler valves or spouts but my invention resides in novel means for automatically cutting off the supply of liquid and in certain details which will not be described.

Within the casing 1 is a diaphragm chamber 17 in which is mounted a diaphragm 18. The diaphragm chamber below the diaphragm is closed to atmosphere except through the small pipe 19 which communicates with the chamber and which has an open end 20 adjacent to the discharge end of the spout. Between the ends of the pipe 19 is a small opening 21 registering with a Venturi space 22 in the tube or casing 1. The top side of the diaphragm 18 is connected to the horizontal arm 23 of an elbow lever 24 which has an upstanding arm 25 with a latch shoulder 26. The arm 25 is urged in the direction of the finger 13 by a spring 27, one end of which bears against the arm 25 and the other against the adjustable plug 28 in the wall of the housing 10. The plug carries a guide pin 29 which projects through an opening 30 in the arm 25. The horizontal arm 23 of the elbow lever 24 has an upstanding end 31 which projects through the housing 10 so it can be manually operated.

When all of the parts are assembled and the operator presses down or swings the lever 14 in a downward direction, the finger 13 will depress the valve stem 6 unseating the valve 5 so that liquid will flow through the filler spout. When the finger 13 is depressed far enough, the latch shoulder 26 will latch over the edge 34 of the finger 13 to hold the valve 5 unseated. Then liquid can flow from the intake end 36 of the spout through the valve seat and out the discharge end of the spout. As the liquid flows through the spout, its velocity will be increased at the Venturi space 22 and since the opening 21 communicates with the Venturi space, air will be drawn through the end 20 of the tube 19 and will co-mingle with the liquid discharged from the end 37 of the spout. The air will follow this path because it will be easier for the liquid to pull air through the inlet end 20 of the tube 19 than it will to exhaust air from the diaphragm chamber 17. Therefore the diaphragm will not be disturbed. However when the liquid reaches a predetermined level, the end 20 of the tube 19 will be submerged in the liquid, consequently the tube 19 will be sealed at both ends but it will still be in open communication with the member 2 through the opening 21. The liquid passing through the spout at high velocity will have a tendency to exhaust air from the pipe 19 so as to create a partial vacuum therein, but since it will be easier for the liquid to exhaust air from the diaphragm chamber 17 than it will to lift the liquid through the portion of the tube 19 having the inlet end 20, the diaphragm will be pulled down and as it moves downward, it will swing the elbow lever 24 so as to cause the shoulder 26 to move off the edge 34 allowing the expansion spring 9 to seat the valve 5, consequently it will be impossible for any liquid to flow through the filler spout after the end 37 and the end 20 of the spout and tube respectively, become submerged in the liquid. As a result of the mechanism just described, the automatic closing of the valve 5 at the proper time will be insured. As liquid is to be flowed from the supply tank to the receiving tank in such quantities as to not seal the receiving tank, then the operator can release the valve by pressing down upon the projection or finger 31 which will cause the shoulder 26 to move off the edge 34 and therefore allow the valve 5 to be seated through the medium of the spring 9. The device is simple in operation, automatic in its control and constructed of rugged parts which will not easily get out of order. The parts may be easily assembled and disassembled for inspection and repairs by removing the casing 10, this being accomplished by taking out the screws 40 for the lever mechanism and the valves can be removed by first removing the plug 4.

What I claim and desire to secure by Letters-Patent is:

1. A filler spout comprising a tubular casing having a valve seat, a valve normally seated upon said seat, means for unseating the valve, a latch for holding the valve unseated and means controlled by the level of the liquid in the receptacle in which the fluid is discharged from the filler spout for unlatching the valve so that it will return to its seat, said means comprising a diaphragm chamber, a diaphragm in the chamber connected to the latching means and a pipe leading from the diaphragm chamber to the discharge end of the filler spout, said pipe having an opening between its ends communicating with the interior of the filler spout.

2. A filler spout comprising a tubular casing having a valve seat, a valve normally seated upon said seat, means for unseating the valve, a latch for holding the valve unseated and means controlled by the level of the liquid in the receptacle in which the fluid is discharged from the filler spout for unlatching the valve so that it will return to its seat, said means comprising a diaphragm chamber, a diaphragm in the chamber connected to the latching means and a pipe leading from the diaphragm chamber to the discharge end of the filler spout, said pipe having an opening between its ends communicating with the interior of the filler spout, the filler spout having a constricted portion adjacent to the opening in the pipe to provide a Venturi tube effect for the liquid passing through the filler spout.

3. A filler spout comprising an elongated tubular body having a constricted Venturi tubular portion between its respective ends, a valve seat, a spring pressed valve normally seated on the valve seat, a valve actuating lever having means for unseating the valve against the action of the spring, a latch tending to engage the lever to maintain the valve open, a diaphragm chamber, a diaphragm in the chamber connected to the latch, and a tube communicating the chamber with atmosphere, the tube terminating at the discharge end of the spout and having an opening adjacent to the Venturi tubular portion.

4. A filler spout comprising an elongated tubular member having a valve seat between its ends, a normally seated valve on the valve seat, a rock shaft, a finger on the rock shaft for engagement with the valve to unseat it, a hand lever connected to the rock shaft for turning it, a latch for engagement with the finger when the valve is unseated so as to maintain the valve off its seat, a diaphragm connected to the latch, a diaphragm chamber beneath the diaphragm and a pipe connecting the diaphragm chamber with atmosphere, the pipe terminating at the discharge end of the tubular member and having an opening communicating with the tubular member between the ends of the tubular member.

5. A filler spout comprising a tubular member having a valve seat between its ends, a valve normally urged on its seat and having a stem, a finger normally resting on the stem, means for actuating the finger to unseat the valve, a latch for engagement with the finger when the valve is unseated, said latch having means whereby the latch may be manually thrown out of engagement with the finger, a diaphragm connected to the latch having movement in one direction to move the latch out of engagement with the finger, a diaphragm chamber on one side of the diaphragm and a pipe communicating the diaphragm chamber with atmosphere, said pipe having an opening intermediate its ends communicating with the interior of the tubular member.

6. A filler spout comprising a tubular member having a valve seat between its ends, a valve normally urged on its seat and having a stem, a finger normally resting on the stem, means for actuating the finger to unseat the valve, a latch for engagement with the finger when the valve is unseated, a diaphragm connected to the latch having movement in one direction to move the latch out of engagement with the finger, a diaphragm chamber on one side of the diaphragm and a pipe communicating the diaphragm chamber with atmosphere, said pipe having an opening intermediate its ends communicating with the interior of the tubular member.

7. A filler spout comprising an elongated tubular member having a valve seat intermediate its ends, one end of the tubular member being its inlet end and the other its discharge end, the discharge end of the tubular member having a constricted portion to cause increase in velocity of the liquid flowing through the tubular member at that point, a spring pressed valve normally seated on the valve seat, a finger for engagement against the end of the valve stem for unseating the valve, a latch for engaging the finger when the valve is unseated, said latch comprising an elbow lever having a vertical arm and a lateral arm, a diaphragm connected to the lateral arm, a diaphragm chamber beneath the diaphragm and a pipe connected to the diaphragm chamber, the pipe having an open end adjacent to the discharge end of the tubular member and provided with an opening at the constricted portion of the tubular member.

In testimony whereof I affix my signature.

AMOS O. PAYNE.